US012643373B2

(12) United States Patent
Li

(10) Patent No.: US 12,643,373 B2
(45) Date of Patent: Jun. 2, 2026

(54) DEHUMIDIFICATION MODE CONTROL METHOD AND APPARATUS, DEVICE, MEDIUM, AND PROGRAM PRODUCT

(71) Applicants: Zhejiang Geely Holding Group Co., LTD., Zhejiang (CN); GEELY AUTOMOBILE RESEARCH INSTITUTE (NINGBO) CO., LTD., Zhejiang (CN)

(72) Inventor: Shuangqi Li, Zhejiang (CN)

(73) Assignees: Zhejiang Geely Holding Group Co., LTD., Zhejiang (CN); GEELY AUTOMOBILE RESEARCH INSTITUTE (NINGBO) CO., LTD., Zhejiang (CN)

( * ) Notice: Subject to any disclaimer, the term of this patent is extended or adjusted under 35 U.S.C. 154(b) by 196 days.

(21) Appl. No.: 18/580,156

(22) PCT Filed: Oct. 29, 2021

(86) PCT No.: PCT/CN2021/127729
§ 371 (c)(1),
(2) Date: Jan. 18, 2024

(87) PCT Pub. No.: WO2023/070606
PCT Pub. Date: May 4, 2023

(65) Prior Publication Data
US 2025/0083494 A1 Mar. 13, 2025

(51) Int. Cl.
B60H 1/32 (2006.01)
B60H 1/00 (2006.01)
B60H 1/14 (2006.01)

(52) U.S. Cl.
CPC ....... B60H 1/3207 (2013.01); B60H 1/00899 (2013.01); B60H 1/143 (2013.01);
(Continued)

(58) Field of Classification Search
CPC .. B60H 1/3207; B60H 1/00899; B60H 1/143; B60H 1/2218; B60H 1/2221;
(Continued)

(56) References Cited

U.S. PATENT DOCUMENTS

| | | | |
|---|---|---|---|
| 10,173,491 B2 | 1/2019 | Kim | |
| 2004/0134217 A1* | 7/2004 | Itoh | F25B 9/008 62/223 |

(Continued)

FOREIGN PATENT DOCUMENTS

| | | |
|---|---|---|
| CN | 101726071 | 6/2010 |
| CN | 103158490 | 6/2013 |

(Continued)

OTHER PUBLICATIONS

"Search Report of Europe Counterpart Application", issued on Apr. 26, 2024, p. 1-p. 9.

(Continued)

*Primary Examiner* — Marc E Norman
(74) *Attorney, Agent, or Firm* — JCIPRNET

(57) ABSTRACT

A dehumidification mode control method and apparatus, a device, a medium and a program product, implemented by means of: obtaining a dehumidification load of a heat pump system and an external ambient temperature when it is detected that a passenger compartment has a dehumidification demand; determining whether to enter a first dehumidification mode according to the dehumidification load, the external ambient temperature and a load threshold; if yes, then determining a control instruction of the first dehumidification mode according to an air temperature at multiple first preset positions in an air transmission heat exchange box and a subcooling degree of a heat exchange medium at at least one second preset position in a transmission pipeline; and then outputting the control instruction so that a first (Continued)

target temperature and a second target temperature simultaneously meet a preset requirement of a dehumidification function.

20 Claims, 3 Drawing Sheets

(52) U.S. Cl.
CPC .............. *B60H 2001/00949* (2013.01); *B60H 2001/3245* (2013.01)

(58) Field of Classification Search
CPC .. B60H 2001/00949; B60H 2001/3245; B60H 2001/3255; B60H 2001/327; B60H 2001/3285; F25B 49/005; F25B 30/02; F25B 2700/02
See application file for complete search history.

(56) References Cited

U.S. PATENT DOCUMENTS

| | | | |
|---|---|---|---|
| 2019/0275861 A1* | 9/2019 | Kyuto | B60H 1/32 |
| 2019/0351739 A1 | 11/2019 | Kim et al. | |
| 2019/0366800 A1 | 12/2019 | Durrani et al. | |
| 2021/0222905 A1* | 7/2021 | Morioka | F24F 11/65 |

FOREIGN PATENT DOCUMENTS

| | | |
|---|---|---|
| CN | 103534539 | 1/2014 |
| CN | 108656895 | 10/2018 |
| CN | 110774860 | 2/2020 |
| CN | 110789290 | 2/2020 |
| CN | 112744051 | 5/2021 |
| CN | 113022261 | 6/2021 |
| CN | 113085485 | 7/2021 |
| JP | H0840056 | 2/1996 |
| JP | 2011068156 | 4/2011 |
| JP | 2018122635 | 8/2018 |
| JP | 2020032749 | 3/2020 |
| JP | 2020082912 | 6/2020 |
| JP | 2020142620 | 9/2020 |
| WO | 2021192760 | 9/2021 |

OTHER PUBLICATIONS

"International Search Report (Form PCT/ISA/210) of PCT/CN2021/127729", mailed on Jul. 28, 2022, with English translation thereof, pp. 1-8.
"Written Opinion of the International Searching Authority (Form PCT/ISA/237) of PCT/CN2021/127729", mailed on Jul. 28, 2022, with English translation thereof, pp. 1-8.
"Notice of allowance of Japan Counterpart Application", issued on Jul. 15, 2025, with English translation thereof, p. 1- p. 5.
"Notice of allowance of China Counterpart Application", issued on Oct. 10, 2025, with English translation thereof, p. 1-p. 7.

* cited by examiner

DEHUMIDIFICATION MODE CONTROL METHOD AND APPARATUS, DEVICE, MEDIUM, AND PROGRAM PRODUCT

CROSS-REFERENCE TO RELATED APPLICATION

This application is a 371 of international application of PCT application serial no. PCT/CN2021/127729, filed on Oct. 29, 2021. The entirety of the above mentioned patent application is hereby incorporated by reference herein and made a part of this specification.

TECHNICAL FIELD

The present application relates to the technical field of new energy vehicles, and more specifically, to a dehumidification mode control method and apparatus, a device, a medium and a program product.

BACKGROUND

With the development of vehicle technology, new energy vehicles have become the main trend of future vehicle development. Although there are many solutions for the control of the passenger compartment in the field of traditional automobiles, new challenges will be faced in new energy vehicles, because new energy vehicles introduce high-power drive motors and large-capacity batteries, which will bring about new impact on the existing vehicle thermal management.

The internal humidity of the vehicle is an important indicator in the control of the passenger compartment. How to realize the humidity control in the new energy vehicle has a great impact on the ride comfort of the new energy vehicle and the safety of the vehicle system.

Therefore, how to control the internal humidity of the new energy vehicle is a technical problem to be solved in the present application.

SUMMARY

The object of the present application is to provide a dehumidification mode control method. By actively absorbing and transferring heat in an external environment of a vehicle to air in a passenger compartment, a temperature of an air outlet of an air conditioner can be increased during dehumidification, and an air temperature in the passenger compartment can be maintained at an appropriate range, while maintaining a dehumidification effect within an optimum range, energy is also saved at the same time, and there is no need to use the vehicle's own energy to supplement heat for the dehumidification process.

In a first aspect, the present application discloses a dehumidification mode control method, including:

obtaining a dehumidification load of a heat pump system and an external ambient temperature when it is detected that a passenger compartment has a dehumidification demand, where the heat pump system includes an external heat exchanger and a first internal heat exchanger;

determining whether to enter a first dehumidification mode according to the dehumidification load, the external ambient temperature and a load threshold, where the first dehumidification mode is configured to perform heat supplement and temperature elevation on air which has flowed through the first internal heat exchanger, using heat absorbed from an external environment through the external heat exchanger during a dehumidification process;

if yes, determining a control instruction of the first dehumidification mode according to an air temperature at multiple first preset positions in an air transmission heat exchange box and a subcooling degree of a heat exchange medium at at least one second preset position in a transmission pipeline, where the first preset position includes an air outlet and an air outlet side of a location where the first internal heat exchanger is located; and outputting the control instruction so that a first target temperature and a second target temperature simultaneously meet a preset requirement of a dehumidification function, where the first target temperature includes an air temperature at the air outlet, the second target temperature is an air temperature at the air outlet side where the first internal heat exchanger is located.

Based on the above technical solutions, when a humidity of the passenger compartment exceeds an optimum humidity range, or the dehumidification function is turned on artificially, firstly, an internal and external ambient temperature of a vehicle is obtained through various on-board sensors, then the dehumidification load of the heat pump system at the current moment is calculated. In addition, the external ambient temperature, i.e., the external ambient temperature of the vehicle, reflects whether it is suitable to actively absorb heat from the outside at present. When the dehumidification load exceeds the load threshold and the external heat is sufficient, heat in the external environment is actively absorbed by the external heat exchanger on the heat pump system, and transferred to the passenger compartment through the heat exchange medium, which saves a power output of a compressor in a dehumidification mode, thereby saving an energy consumption of the vehicle. In this process, a control of the first target temperature at the air outlet and the air temperature of the air outlet side where the first internal heat exchanger (such as an evaporator) is located, i.e., a second target temperature, is related to the stability and safety of the entire heat pump system. In the prior art, it is difficult to balance the two, which often causes vibration and noise of the heat pump system. However, the present application implements multi-stage temperature monitoring and closed-loop adjustment in the air transmission heat exchange box, combined with a closed-loop control of the subcooling degree of the heat exchange medium at a key position, which maintains both the air temperature at the air outlet and the air temperature of the air outlet side where the first internal heat exchanger is located within their respective safe ranges, preventing the stability and safety issues caused when the heat pump system absorbs heat from the external environment to replace part of the output power of the compressor.

In an implementation, the heat pump system further includes a second internal heat exchanger, and the control instruction includes a closed-loop control instruction for performing closed-loop control on each object to be controlled in the heat pump system, a function of the object to be controlled includes circulating the heat exchange medium along a parallel circulation path in the transmission pipeline, and the parallel circulation path includes: a heat absorption path, a refrigeration path and a heat supplement path, the heat absorption path and the refrigeration path are connected in parallel and then connected in series with the heat supplement path;

the external heat exchanger is located on the heat absorption path, the first internal heat exchanger is located on the refrigeration path, the second internal heat exchanger is located on the heat supplement path, the second internal heat exchanger is configured to transfer heat absorbed by the external heat exchanger to the air which has flowed through the first internal heat exchanger.

By using the compressor as a start/end point of the parallel circulation path, the parallel heat absorption path and refrigeration path meet at the compressor, forming a characteristics of a common low pressure of the external heat exchanger and the first internal heat exchanger, both of which evaporate and absorb heat simultaneously. The external heat exchanger absorbs the heat of the external environment, and the first internal heat exchanger absorbs the heat of the air in the passenger compartment, so that the water vapor in the air in the passenger compartment is condensed and precipitated to achieve the purpose of refrigeration and dehumidification. Further, the second internal heat exchanger is configured to perform heat supplement and temperature rewarming on the air blown by the blower to the first internal heat exchanger for condensation and dehumidification, so as to avoid the need of continuously reducing the temperature of the first internal heat exchanger in order to maintain the dehumidification effect, which ends up to the detrimental effect of icing/frosting of the first internal heat exchanger.

In an implementation, the second preset position includes an output end of the second internal heat exchanger, and correspondingly, the subcooling degree includes a target subcooling degree of the output end;

the determining the control instruction of the first dehumidification mode according to the air temperature at the multiple first preset positions in the air transmission heat exchange box and the subcooling degree of the heat exchange medium at the at least one second preset position in the transmission pipeline includes:

determining a first closed-loop control instruction of a compressor according to the first target temperature and a first closed-loop control model;

determining a second closed-loop control instruction of a first electronic expansion valve according to the target subcooling degree and a second closed-loop control model, where the first electronic expansion valve is installed at the output end of the second internal heat exchanger; and determining a third closed-loop control instruction of a second electronic expansion valve according to the second target temperature and a third closed-loop control model, where the second electronic expansion valve is installed at an input end of the first internal heat exchanger.

The compressor is configured to perform closed-loop control on the temperature of the air outlet. Compared with the prior art in which the compressor is configured to control the temperature of the air outlet side where the first internal heat exchanger is installed, i.e., the second target temperature, in the present application, the temperature of the air outlet, i.e., the first target temperature, is controlled by the compressor, which is easier to achieve the purpose of stable control. In this way, the technical obstacle of simultaneous stable control of the first target temperature and the second target temperature is overcome, and the problem of vibration of the heat pump system caused by the prior art is avoided.

In an implementation, before the determining the control instruction of the first dehumidification mode according to the air temperature at the multiple first preset positions in the air transmission heat exchange box and the subcooling degree of the heat exchange medium at the at least one second preset position in the transmission pipeline, the method further includes:

determining a first lower limit for operating the second electronic expansion valve, according to the external ambient temperature and a preset first corresponding relationship, where the second electronic expansion valve is installed at an input end of the first internal heat exchanger;

obtaining a temperature of the passenger compartment, a percentage of internal circulation, a percentage of external circulation and a blower air volume; and using a preset algorithm to determine a first upper limit for operating the second electronic expansion valve according to the external ambient temperature, the temperature of the passenger compartment, the percentage of internal circulation, the external circulation percentage and the blower air volume;

a function of the first upper limit and the first lower limit includes: suspending or switching a dehumidification mode of the heat pump system when the external ambient temperature exceeds a first temperature range, limiting an adjustment ability of the first dehumidification mode to ensure the safety and stability of the system.

In an implementation, before the determining the control instruction of the first dehumidification mode according to the air temperature at the multiple first preset positions in the air transmission heat exchange box and the subcooling degree of the heat exchange medium at the at least one second preset position in the transmission pipeline, the method further includes:

determining a second upper limit and a second lower limit for operating a first electronic expansion valve according to the external ambient temperature and a preset second corresponding relationship, where the first electronic expansion valve is installed at an output end of the second internal heat exchanger;

a function of the first upper limit and the first lower limit includes: suspending or switching a dehumidification mode of the heat pump system when the external ambient temperature exceeds a second temperature range, limiting an adjustment ability of the first dehumidification mode to ensure the safety and stability of the system.

In the above two implementations, the reason why the upper and lower limits of the opening degree of the first electronic expansion valve and/or the second electronic expansion valve are limited is that the heat that the heat pump system can actively absorb is related to the external environment temperature under the limitation of the external environment. In order to avoid that the opening degree of the electronic expansion valve is continuously increased or decreased with the objective limit being ignored when the heat pump system is working, causing system oscillation and serious noise, or the excessive opening degree fluctuation range results in a long adjustment time when there is a huge difference between the electronic expansion valve's current opening degree and target opening degree of the control instruction in a certain time, which will also affect the stability of the system; or the adjustment function of the electronic expansion valve has failed after exceeding the upper and lower limits. In order to prevent the controller from issuing an invalid target opening degree, its upper and lower limits are limited to maintain the stability of the entire heat pump system.

In an implementation, after outputting the control instruction, the method further includes:

if it is detected that an opening degree of the first electronic expansion valve is the second lower limit, and a subcooling degree of the output end of the second internal heat exchanger is less than or equal to a preset subcooling degree threshold during a preset time, switching a dehumidification mode to a second dehumidification mode, where the second dehumidification mode is configured to perform heat supplement and temperature elevation on the air which has flowed through the first internal heat exchanger, using heat of a cooling circuit of a battery or heat of a heating device during the dehumidification process.

The situation of this implementation shows that the first dehumidification mode can no longer meet a dehumidification requirement, or that the external ambient temperature is too low and the absorbed heat is insufficient, it is necessary to invoke heat from other heating devices inside the vehicle to supplement the output power of the compressor.

In an implementation, after the outputting the control instruction, the method further includes:

obtaining a pressure value at an input end of a compressor;

if the pressure value is less than a first pressure threshold, suspending outputting the second closed-loop control instruction of the first electronic expansion valve, switching to increasing an opening degree of the first electronic expansion valve at a preset rate until the pressure value is greater than or equal to a second pressure threshold to resume outputting the second closed-loop control instruction, where the first electronic expansion valve is installed at an output end of the second internal heat exchanger.

By controlling the pressure at the low-pressure end, the pressure of the heat pump system is prevented from being unbalanced. This is because the way of parallel dehumidification according to the prior art is likely to cause system oscillation. In order to improve safety, reduce oscillation or prevent oscillation beyond the system's adjustment capacity, the inventor of the present application found that monitoring the pressure value at the low-pressure end is an effective measure to prevent oscillation. Since the calculation and execution of the control instruction has a certain delay, the pressure value at the low-pressure end is lower than the first pressure threshold, which means that the influence of this delay may make the working state of the entire system exceed the system adjustment ability under the first dehumidification mode, or that the closed-loop adjustment is too fast, and the system state does not maintain up with it in time. At this time, the closed-loop control is suspended and the adjustment is continued after the pressure on the low-pressure side recovers, so that the stability of the system is further guaranteed.

In an implementation, after the outputting the control instruction, the method further includes:

in response to a frosting protection starting instruction of the first internal heat exchanger, closing a second electronic expansion valve, recording a first opening degree value of the second electronic expansion valve before closing, and maintaining a rotational speed of a compressor unchanged, where the second electronic expansion valve is installed at an input end of the first internal heat exchanger.

In an implementation, in response to a frosting protection shutdown instruction of the first internal heat exchanger, an initial opening degree value of the second electronic expansion valve is set to the first opening degree value, and a closed-loop control of the second electronic expansion valve is restored.

Although the control strategy is theoretically safe, in the actual application, due to the influence of various factors that cannot be predicted in advance, such as the conflict of the effective time of various control instructions and the delay characteristics when executing, the phenomenon of frosting of the first internal heat exchanger will still occur in extreme cases. After the sensor detects frosting, the frosting protection will be activated immediately, the heat exchange of the first internal heat exchanger will be stopped, and the dehumidification is continued after the defrosting, avoiding the danger of damage to the first internal heat exchanger due to frosting/icing of the first internal heat exchanger, and improving the stability and safety of the heat pump system.

In an implementation, the determining whether to enter the first dehumidification mode according to the dehumidification load, the external ambient temperature and the load threshold includes:

determining to enter the first dehumidification mode if the dehumidification load is greater than or equal to the load threshold and the external ambient temperature is less than or equal to a first temperature threshold.

In an implementation, the determining whether to enter the first dehumidification mode according to the dehumidification load, the external ambient temperature and the load threshold further includes:

if the dehumidification load is less than the load threshold, or the external ambient temperature is greater than or equal to a second temperature threshold, determining to enter a second dehumidification mode, where the second dehumidification mode is configured to perform heat supplement and temperature elevation on the air which has flowed through the first internal heat exchanger, using heat of a cooling circuit of a battery or heat of a heating device during the dehumidification process, the second temperature threshold is greater than the first temperature threshold.

In an implementation, after the determining to enter the second dehumidification mode, the method further includes:

obtaining a water temperature of the cooling circuit of the battery in a coolant fluid circulation system;

determining whether a residual heat of the battery meets a heat supplement requirement according to the water temperature and a target air outlet temperature of the air outlet;

if yes, guiding a coolant fluid of the cooling circuit of the battery into a warm air core, which is configured to heat the air which has flowed through the first internal heat exchanger, by controlling a corresponding electronic expansion valve, where the warm air core is configured to perform heat supplement and temperature elevation on the air which has flowed through the first internal heat exchanger through the coolant fluid; and if not, turning on a heating device to heat the coolant fluid flowing through the warm air core.

When the external environment cannot provide enough heat, the heat is absorbed from the heating device inside the vehicle is chosen for dehumidification and heat supplement, and preferably battery cooling or a residual heat in coolant fluid of the driving motor or engine is used for heat supplement, to realize the recovery and management of heat energy. When the residual heat is still not enough, its own energy is used for heating, to achieve the effect of reducing energy consumption as much as possible while ensuring the dehumidification effect, so that more energy can be used to drive vehicles to improve the mileage of new energy vehicles.

In the second aspect, the present application discloses a dehumidification mode control apparatus, including:

an obtaining module, configured to obtain a dehumidification load of a heat pump system and an external ambient temperature when it is detected that a passenger compartment has a dehumidification demand, where the heat pump system includes an external heat exchanger and a first internal heat exchanger;

a processing module, configured to:

determine whether to enter a first dehumidification mode according to the dehumidification load, the external ambient temperature and a load threshold, where the first dehumidification mode is configured to perform heat supplement and temperature elevation on air which has flowed through the first internal heat exchanger, using heat absorbed from an external environment through the external heat exchanger during a dehumidification process;

if yes, determine a control instruction of the first dehumidification mode according to an air temperature at multiple first preset positions in an air transmission heat exchange box and a subcooling degree of a heat exchange medium at at least one second preset position in a transmission pipeline, where the first preset position includes an air outlet and an air outlet side of a location where the first internal heat exchanger is located; and outputting the control instruction so that a first target temperature and a second target temperature simultaneously meet a preset requirement of a dehumidification function, where the first target temperature includes an air temperature at the air outlet, the second target temperature is an air temperature at the air outlet side.

In a third aspect, the present application discloses an electronic device including: a processor, and a memory communicatively connected with the processor;

the memory stores computer-executable instructions;

the processor executes the computer-executable instructions stored in the memory, so as to implement any possible dehumidification mode control method in the first aspect.

In a fourth aspect, the present application discloses a computer-readable storage medium, stored with computer-executable instructions which, when executed by a processor, are configured to implement any possible method in the first aspect.

In a fifth aspect, the present application discloses a computer program product, including a computer program which, when executed by a processor, implements any possible method in the first aspect.

In a sixth aspect, the present application discloses a computer program, including a program code which, when operated by a computer, executes any possible method in the first aspect.

In combination with the above technical solutions, the present application provides a dehumidification mode control method and apparatus, a device, a medium and a program product, implemented by means of: obtaining a dehumidification load of a heat pump system and an external ambient temperature when it is detected that a passenger compartment has a dehumidification demand, where the heat pump system includes an external heat exchanger and a first internal heat exchanger; then determining whether to enter a first dehumidification mode according to the dehumidification load, the external ambient temperature and a load threshold, where the first dehumidification mode is configured to perform heat supplement and temperature elevation on air which has flowed through the first internal heat exchanger, using heat absorbed from an external environment through the external heat exchanger during a dehumidification process; if yes, then determining a control instruction of the first dehumidification mode according to an air temperature at multiple first preset positions in an air transmission heat exchange box and a subcooling degree of a heat exchange medium at at least one second preset position in a transmission pipeline; and then outputting the control instruction so that a first target temperature and a second target temperature simultaneously meet a preset requirement of a dehumidification function. The technical problem of how to dehumidify new energy vehicles is solved. By actively absorbing the heat of the external environment to supplement heat to the dehumidified air, the technical effects of saving energy and improving the stability and safety of the system are achieved.

DETAILED DESCRIPTION OF THE EMBODIMENTS

Figure 1:
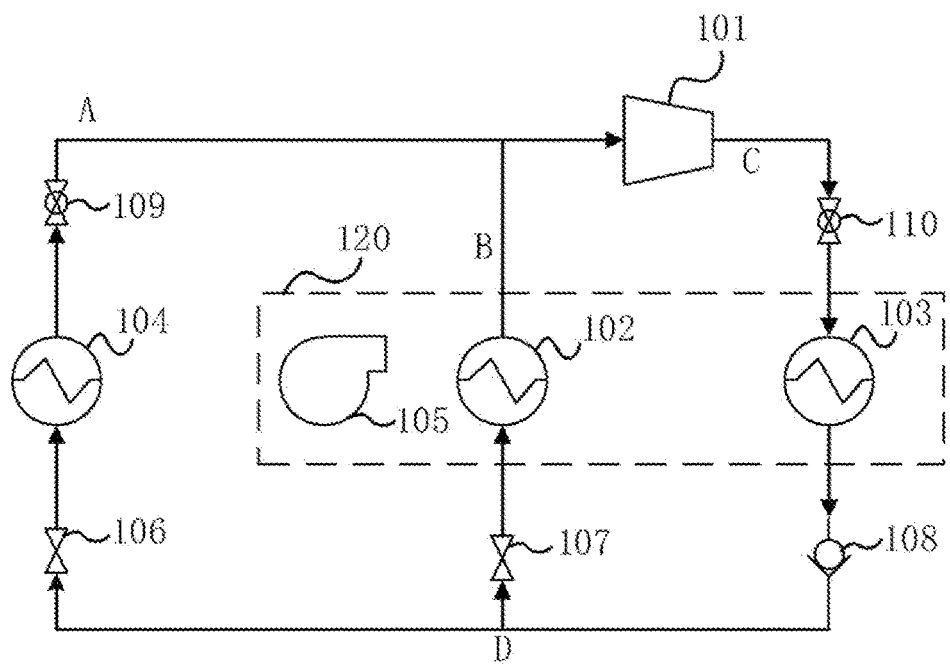
FIG. 1 is a schematic structural diagram of an on-board heat pump system provided by the present application.

In order to make the objects, technical solutions and advantages of the embodiments of the present application clearer, the technical solutions in embodiments of the present application will be clearly and completely described below with reference to the drawings in the embodiments of the present application. Obviously, the described embodiments are only a part of the embodiments of the present application, but not all the embodiments. Based on the embodiments in the present application, all other embodiments obtained by those of ordinary skills in the art without creative work, including but not limited to the combination of multiple embodiments, all fall within the protection scope of the present application.

The terms "first", "second", "third", "fourth", etc. (if any) in the specification, claims, and the above-mentioned drawings of the present application are configured to distinguish similar objects, and not necessarily configured to describe a specific sequence or order. It is to be understood that the data so used are interchangeable under appropriate circumstances such that the embodiments of the present application described herein, for example, can be practiced in sequences other than those illustrated or described herein. Furthermore, the terms "including" and "having", as well as any variations thereof, are intended to cover a non-exclusive inclusion, for example, a process, method, system, product or device including a sequence of steps or elements is not necessarily limited to the expressly listed, instead, may include other steps or elements not explicitly listed or inherent to the process, method, product or device.

First, the terms involved in the present application are explained.

PTC (positive temperature coefficient) heater: is composed of PTC ceramic heating element and aluminum tube. This type of PTC heating element has the advantages of small thermal resistance and high heat exchange efficiency. It is an automatic-constant-temperature and energy-saving electric heater. Its outstanding feature lies in the safety performance. Under any application conditions, a phenomenon, e.g., the "redness" on the surface of the electric heating tube heater which causes burns, fire and other safety hazards, will not occur.

The principle of dehumidification in the passenger compartment of the vehicle is that water vapor is cooled and condenses into water droplets. The specific process is that: the pressurized refrigerating fluid is sent to the condenser through the compressor to condense and release heat, and then the refrigerating fluid is input into the evaporator through the electronic expansion valve, and the refrigerating fluid evaporates and absorbs heat in the evaporator, reducing the temperature of the evaporator, the refrigerating fluid is then returned to the compressor. The on-board blower blows the air in the vehicle to the low-temperature evaporator, and when the air in the vehicle is cooled, the water vapor in the vehicle is condensed and precipitated, so as to achieve the purpose of cooling and dehumidification. Due to the cooling effect of the on-board air conditioner, the temperature of the air inside the vehicle continues to drop, resulting in a decrease in the dehumidification effect of the above-mentioned dehumidification process. In order to maintain the dehumidification effect, the temperature of the air in the vehicle can be increased by supplementing heat to the air in the vehicle, so as to dehumidify cyclically.

Compared with traditional vehicles, new energy vehicles have higher requirements in terms of energy management, thereby making how to save energy during the dehumidification process become an important factor in solving the technical problem of how to control the internal humidity of the new energy vehicles.

The inventive concept of the application is that:

the inventors of the present application found that in the traditional vehicles, a dehumidification mode is adopted by means of using the heat pump system of the air conditioner for refrigeration, and then using the PTC heater of the coolant fluid circulation system for heat supplement, which consumes a lot of energy. For energy vehicles having higher requirements in terms of energy management, it cannot meet the energy-saving requirements. The inventor of the present application found that the heat source for heat supplement of the air in the vehicle is a breakthrough in energy saving. Therefore, the present application uses the external condenser of the heat pump system to absorb heat from the environment outside the vehicle as one of the sources of supplement heat to replace part of the output power of the compressor, which requires to change the control method of each component in the heat pump system, so as to achieve the purpose of absorbing heat from the environment outside the vehicle for heat supplement.

Specific application scenarios of the present application is as follows.

FIG. 1 is a schematic structural diagram of an on-board heat pump system provided by the present application. As shown in FIG. 1, the on-board heat pump system includes: a compressor 101, an evaporator 102, an internal condenser 103, an external condenser 104, a blower 105, an electronic expansion valve 106, an electronic expansion valve 107, a one-way stop valve 108, a solenoid valve 109, a solenoid valve 110, and an air conditioning box 120, etc.

Where, the blower 105 sucks air in a vehicle and blows it to the evaporator 102, and water vapor in the air is cooled, condensed and precipitated, thereby achieving the purpose of dehumidification. In the present application, the external condenser 104 absorbs a heat from an environment outside the vehicle by evaporating and absorbing heat through a heat exchange medium, i.e., a refrigerant, and then performs heat supplement and temperature elevation on cooled air in the air conditioning box 120 through the function of the internal condenser 103, cycling these steps to achieve the purpose of dehumidification in the vehicle. Since the evaporator 102 and the external condenser 104 are connected in parallel and both are evaporating and absorbing heat, this dehumidification mode can also be called a parallel dehumidification mode. Although the principle of the parallel dehumidification mode is simple, its specific control process is much more complicated than the traditional dehumidification mode using PTC heating device to heat the air, because the external condenser 104 does not play a role of condensation and heat release as that in a traditional air conditioning system. In the present application, the refrigerant in the external condenser 104 evaporates and absorbs heat, which requires subversive modifications to traditional control strategies to overcome this technical obstacle.

Because the parallel dehumidification needs to meet a target air temperature at an air outlet side of the evaporator and a target air outlet temperature of an air outlet, if a control is carried out according to the traditional method, although the compressor and the electronic expansion valve have their own control targets, e.g., the compressor controls the temperature of the air outlet and the electronic expansion valve in front of the evaporator controls the air temperature of the air outlet side of the evaporator, but when the compressor controls the temperature of the air outlet, it will affect the air temperature of the air outlet side of the evaporator; when the electronic expansion valve controls the air temperature of the air outlet side of the evaporator, it will affect the temperature of the air outlet. There is a coupling between the compressor and the electronic expansion valve. If the control is performed not well, it will inevitably cause system oscillation, and eventually the outlet air temperature and the air temperature of the air outlet side of the evaporator cannot be stably controlled.

The technical solution of the present application and how the technical solution of the present application solves the above technical problems will be described in detail below with specific embodiments. The following specific embodiments may be combined with each other, and the same or similar concepts or processes may not be repeated in some embodiments. Embodiments of the present application will be described below with reference to the accompanying drawings.

Figure 2:
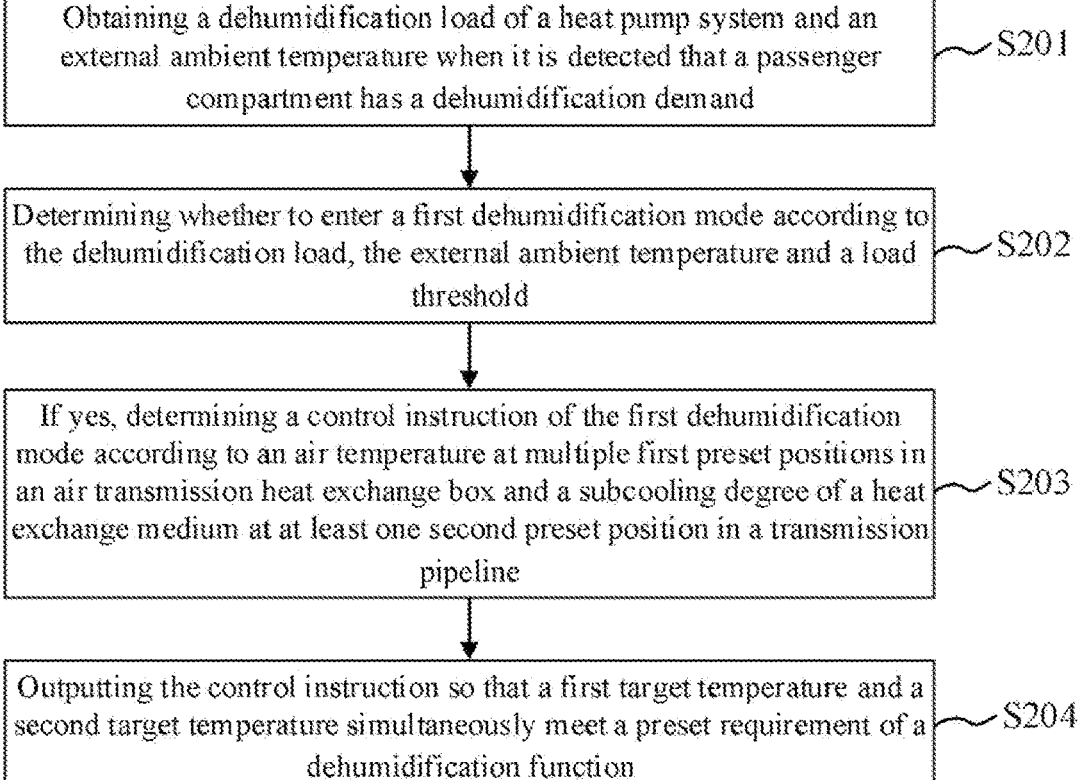
FIG. 2 is a schematic flowchart of a dehumidification mode control method provided by an embodiment of the present application.

FIG. 2 is a schematic flowchart of a dehumidification mode control method provided by an embodiment of the present application. As shown in FIG. 2, the specific steps of the control method of the dehumidification mode include:

S201. Obtaining a dehumidification load of a heat pump system and an external ambient temperature when it is detected that a passenger compartment has a dehumidification demand.

In this step, the passenger compartment having the dehumidification demand includes that a humidity of the passenger compartment exceeds an optimum humidity range (such as 50% to 70%), a dehumidification function is artificially turned on, and a control of the heat pump system produces an effect equivalent to dehumidification.

Specifically, when a humidity sensor in a vehicle detects that an air humidity in the vehicle is greater than 70%, a central controller of the vehicle automatically sends an initial starting instruction.

Alternatively, when a user manually presses a dehumidification button, or clicks a dehumidification control on a touch screen, a dehumidification starting instruction is issued.

In this step, the obtaining the dehumidification load of the heat pump system includes:

obtaining a temperature of the passenger compartment, a percentage of internal circulation, a percentage of external circulation and a blower air volume; and using a preset load model to determine the dehumidification load according to a preset standard value of a first target temperature, the external ambient temperature, the percentage of external circulation, the temperature of the passenger compartment, the percentage of internal circulation and the blower air volume.

For example, the preset load model can be expressed as:

$$\text{dehumidification load} = (\text{target air outlet temperature} - \text{actual air inlet temperature}) * \text{blower air volume} * \text{air specific heat.}$$

Where, actual air inlet temperature=external ambient temperature*percentage of external circulation+temperature of passenger compartment*percentage of internal circulation.

The obtaining the external ambient temperature includes:

obtaining an air temperature of the vehicle in a current driving environment through at least one temperature sensor installed outside the vehicle;

or, determining an air temperature within a preset geographical range to which a current driving position belongs as the external ambient temperature by means of wireless communication, from a road-based unit or a big data platform, according to current positioning information of the vehicle (e.g., positioning information of the global positioning system (GPS)).

S202. Determining whether to enter a first dehumidification mode according to the dehumidification load, the external ambient temperature and a load threshold.

In this step, the first dehumidification mode is configured to perform heat supplement and temperature elevation on air which has flowed through a first internal heat exchanger, using heat absorbed from an external environment through an external heat exchanger during a dehumidification process. When the dehumidification load is greater than or equal to the load threshold and the external ambient temperature exceeds a preset temperature threshold, i.e., the external environment can provide sufficient heat supplement energy, it can enter the first dehumidification mode.

In the present embodiment, the heat pump system includes an external heat exchanger, a first internal heat exchanger, a second internal heat exchanger, and a heat exchange medium circulating along a parallel circulation path (also referred to as a refrigerating fluid, a refrigerant).

The parallel circulation path includes: a heat absorption path, a refrigeration path and a heat supplement path. The heat absorption path and the refrigeration path are connected in parallel and then connected in series with the heat supplement path; the external heat exchanger is located on the heat absorption path, the first internal heat exchanger is located on the refrigeration path, and the second internal heat exchanger is located on the heat supplement path, the second internal heat exchanger is configured to transfer heat absorbed by the external heat exchanger from the external environment to the air which has flowed through the first internal heat exchanger.

In the present embodiment, as shown in FIG. 1, the external heat exchanger is the external condenser 104, the first internal heat exchanger is the evaporator 102, and the second internal heat exchanger is the internal condenser 103.

As shown in FIG. 1, the heat absorption path is between points A and D, the refrigeration path is between points B and D, and the heat supplement path is between points C and D. Input ends of the heat absorption path and the refrigeration path are connected to an output end of the heat supplement path, and output ends of the heat absorption path and the refrigeration path are connected to an input end of the heat supplement path. In addition, the heat exchange medium of the heat absorption path and the refrigeration path, i.e., the refrigerant, shares a common low pressure.

By using the compressor 101 as a start/end point of the parallel circulation path, the parallel heat absorption path and refrigeration path meet at the compressor 101, forming a characteristics of a common low pressure of the external heat exchanger and the first internal heat exchanger, both of which evaporate and absorb heat simultaneously. The external heat exchanger absorbs the heat of the external environment, and the first internal heat exchanger absorbs the heat of the air in the passenger compartment, so that the water vapor in the air in the passenger compartment is condensed and precipitated to achieve the purpose of refrigeration and dehumidification. Further, the second internal heat exchanger is configured to perform heat supplement and temperature rewarming on the air blown by the blower to the first internal heat exchanger for condensation and dehumidification, so as to avoid the need of continuously reducing the temperature of the first internal heat exchanger in order to maintain the dehumidification effect, which ends up to the detrimental effect of icing/frosting of the first internal heat exchanger.

S203. If yes, determining a control instruction of the first dehumidification mode according to an air temperature at multiple first preset positions in an air transmission heat exchange box and a subcooling degree of a heat exchange medium at at least one second preset position in a transmission pipeline.

In this step, the first preset position includes an air outlet and an air outlet side where a first internal heat exchanger is installed, and a corresponding air temperature includes a first target temperature and a second target temperature, the first target temperature includes an air temperature at the air outlet, the second target temperature is an air temperature at the air outlet side where the first internal heat exchanger is located, and the second preset position includes an output end of the second internal heat exchanger in a transmission pipeline of the heat exchange medium, correspondingly, the subcooling degree includes a target subcooling degree of the output end.

In the present embodiment, a first closed-loop control instruction of the compressor is determined according to the first target temperature and a first closed-loop control model;

a second closed-loop control instruction of a first electronic expansion valve is determined according to the target subcooling degree and a second closed-loop control model, where the first electronic expansion valve is installed at the output end of the second internal heat exchanger; and a third closed-loop control instruction of a second electronic expansion valve is determined according to the second target temperature and a third closed-loop control model, where the second electronic expansion valve is installed at an input end of the first internal heat exchanger.

It should be noted that the types of the first closed-loop control model, the second closed-loop control model and the third closed-loop control model include: PI (proportion integral) proportion integral model, PID (proportion integral differential) proportion integral differential model, etc. Those skilled in the art can select appropriate models and control parameters of each closed-loop control model according to actual application scenarios.

S204. Outputting the control instruction so that a first target temperature and a second target temperature simultaneously meet a preset requirement of a dehumidification function.

In this step, the first target temperature includes an air temperature at the air outlet of the air transmission heat exchange box, and the second target temperature is an air temperature at the air outlet side where the first internal heat exchanger is located.

Specifically, corresponding closed-loop control instructions are respectively sent to the compressor, the first electronic expansion valve, and the second electronic expansion valve.

As shown in FIG. 1, the electronic expansion valve 109 and the electronic expansion valve 110 are opened, the parallel circulation path is opened, and then the first closed-loop control instruction is sent to the compressor 101, and the second closed-loop control instruction is sent to the first electronic expansion valve, i.e., the electronic expansion valve 106, and the third closed-loop control instruction is send to the second electronic expansion valve, i.e., the electronic expansion valve 107.

The air temperature at the air outlet of the air conditioning box 120 is controlled by the compressor 101, so that the air temperature at the air outlet reaches the target air outlet temperature; the subcooling degree of the second internal heat exchanger, i.e., the internal condenser 103, is controlled by the first electronic expansion valve 106, making the refrigerant work in a more efficient state without refrigerant flow noise. The air temperature at the air outlet side of the evaporator 102 is controlled through the second electronic expansion valve, i.e., the electronic expansion valve 107, so that the temperature reaches the target air temperature. The combined effects of the three make the first target temperature and the second target temperature meet the preset requirements at the same time.

The preset requirement includes: the first target temperature cannot be lower than a first preset target value, and the second target temperature cannot be lower than a second preset target value, since if the first target temperature is too low, the air temperature in the vehicle will drop too quickly, which will affect the subsequent condensation and dehumidification effect. The reason is that as the air temperature decreases, the temperature of the evaporator 102 needs to be continuously lowered to achieve the effect of condensation and dehumidification, and a continuous cooling of the evaporator 102 will cause frosting or freezing, resulting in damage to the evaporator 102. Therefore, in order to ensure a continuous dehumidification, the first target value and the second target value must be controlled simultaneously. There is an inseparable coupling relationship between the two.

In an implementation, multiple control threads may be set to perform separate closed-loop control on the compressor, the first electronic expansion valve and the second electronic expansion valve.

Based on the above technical solutions, when a humidity of the passenger compartment exceeds an optimum humidity range, or the dehumidification function is turned on artificially, or the control of the heat pump system produces the same effect as the dehumidification, firstly, an internal and external ambient temperature of a vehicle is obtained through various on-board sensors, then the dehumidification load of the heat pump system at the current moment is calculated. In addition, the external ambient temperature, i.e., the external ambient temperature of the vehicle, reflects whether it is suitable to actively absorb heat from the outside at present. When the dehumidification load exceeds the load threshold and the external heat is sufficient, heat in the external environment is actively absorbed by the external heat exchanger on the heat pump system, and transferred to air which has flowed through the first internal heat exchanger through the heat exchange medium, so that the side effect of the temperature drop of the passenger compartment due to refrigeration and dehumidification is balanced or improved to achieve the purpose of maintaining the best dehumidification effect. At the same time, a natural heat of the external environment is configured to replace part of output power of the compressor, which also saves an energy consumption of a vehicle. In this process, a control of the first target temperature at the air outlet and the temperature of the first internal heat exchanger (such as the evaporator), i.e., a second target temperature, is related to the stability and safety of the entire heat pump system. In the prior art, it is difficult to balance the two, which often causes vibration and noise of the heat pump system. However, the present application implements multi-stage temperature monitoring and closed-loop adjustment in the air transmission heat exchange box, combined with a closed-loop control of the subcooling degree of the heat exchange medium at a key position, which maintains both the air temperature at the air outlet and the temperature of the evaporator within their respective safe ranges, avoiding the stability and safety issues caused by the heat pump system preventing the stability and safety issues caused when the heat pump system absorbs the heat from the external environment to perform heat supplement on the air temperature of the air which has flowed through the first internal heat exchanger.

The embodiment of the present application provides a dehumidification mode control method, implemented by means of: obtaining a dehumidification load of a heat pump system and an external ambient temperature when it is detected that a passenger compartment has a dehumidification demand, where the heat pump system includes an external heat exchanger and a first internal heat exchanger; then determining whether to enter a first dehumidification mode according to the dehumidification load, the external ambient temperature and a load threshold, where the first dehumidification mode is configured to perform heat supplement and temperature elevation on air which has flowed through the first internal heat exchanger, using heat absorbed from an external environment through the external heat exchanger during a dehumidification process; if yes, then determining a control instruction of the first dehumidification mode according to an air temperature at multiple first preset positions in an air transmission heat exchange box and a subcooling degree of a heat exchange medium at at least one second preset position in a transmission pipeline; and then outputting the control instruction so that a first target temperature and a second target temperature simultaneously meet a preset requirement of a dehumidification function. The technical problem of how to dehumidify new energy vehicles is solved. By actively absorbing the heat of the external environment to supplement heat to the dehumidified air, the technical effects of saving energy and improving the stability and safety of the system are achieved.

Figure 3:
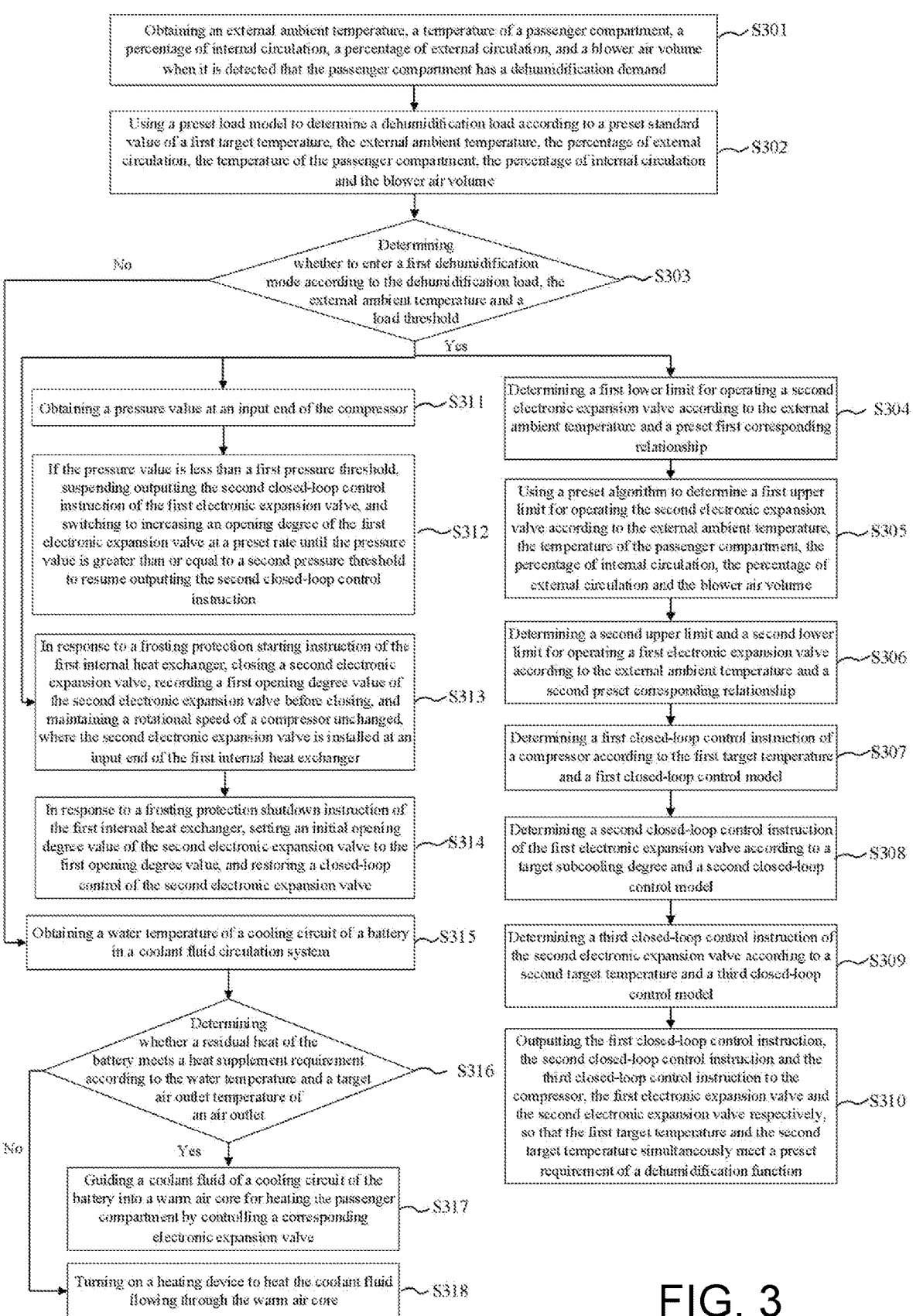
FIG. 3 is a schematic flowchart of another dehumidification mode control method provided by an embodiment of the present application.

FIG. 3 is a schematic flowchart of another dehumidification mode control method provided by an embodiment of the present application. As shown in FIG. 3, the specific steps of the control method of the dehumidification mode include:

S301. Obtaining an external ambient temperature, a temperature of a passenger compartment, a percentage of internal circulation, a percentage of external circulation, and a blower air volume when it is detected that the passenger compartment has a dehumidification demand.

For a detailed explanation of this step, reference may be made to step S201, which will not be repeated here.

S302. Using a preset load model to determine a dehumidification load according to a preset standard value of a first target temperature, the external ambient temperature, the percentage of external circulation, the temperature of the passenger compartment, the percentage of internal circulation and the blower air volume.

In this step, the actual inlet air temperature when the blower blows the air in the passenger compartment to the first internal heat exchanger is first obtained as: actual inlet air temperature=external ambient temperature*external circulation percentage+temperature of passenger compartment*percentage of internal circulation.

It should be noted that when the air conditioner in the vehicle is turned on, the circulation mode of the air includes internal circulation and external circulation. The internal circulation refers to that the blower draws air from the inside of the vehicle, i.e., the passenger compartment, and blows it into the air transmission heat exchange box, i.e., the air conditioning box 120. After the air passes through various heat exchangers in the air transmission heat exchange box to be cooled down and/or heated up, it returns to the inside of the vehicle, i.e., the passenger compartment, through the air outlet, thus forming an internal circulation.

The external circulation refers to that: the blower draws air from the outside of the vehicle, i.e., the external environment, and blows it into the air transmission heat exchange box. After the air passes through various heat exchangers in the air transmission heat exchange box to be cooled down and/or heated up, it is blown to the inside of the vehicle, i.e., the passenger compartment through the air outlet.

Since there are users such as drivers and passengers in the vehicle, respiration will consume oxygen in the vehicle and increase the concentration of carbon dioxide. If the internal circulation lasts for a long time, the user will be hypoxic. Therefore, it is necessary to allocate a circulation ratio to the internal circulation and the external circulation to avoid the occurrence of hypoxia.

Hence, when determining the dehumidification load, in order to ensure accuracy, it is necessary to first calculate the actual inlet air temperature.

Then, since the air outlet temperature at the air outlet designed for different dehumidification modes is different, the dehumidification load will be different. Therefore, in order to meet the initial setting requirements of the first dehumidification mode, it is necessary to calculate the dehumidification load by setting the preset target outlet air temperature at the air outlet in advance.

In the present embodiment, the calculation model of the dehumidification load is as follows:

$$\text{dehumidification load}=(\text{target air outlet temperature}-\text{actual air inlet temperature})*\text{blower air volume}*\text{air specific heat.}$$

S303. Determining whether to enter a first dehumidification mode according to the dehumidification load, the external ambient temperature and a load threshold.

In this step, if the dehumidification load is greater than or equal to the load threshold and the external ambient temperature is less than or equal to the first temperature threshold, it is determined to enter the first dehumidification mode, i.e., step S304 is executed;

if the dehumidification load is less than the load threshold and the external ambient temperature is greater than or equal to the second temperature threshold, it is determined to enter a second dehumidification mode, i.e., step S315 is executed.

The first dehumidification mode is configured to perform heat supplement and temperature elevation on air which has flowed through the first internal heat exchanger, using heat absorbed from the external environment through the external heat exchanger during the dehumidification process.

The second dehumidification mode is configured to perform heat supplement and temperature elevation on the air which has flowed through the first internal heat exchanger, using heat of a cooling circuit of a battery and/or heat of a heating device during the dehumidification process, the second temperature threshold is greater than the first temperature threshold. When the first dehumidification mode can no longer meet the dehumidification requirement, or the external ambient temperature is too low, and the absorbed heat is insufficient to make up for the temperature drop caused by cooling and dehumidification, it is necessary to invoke heat from other heating devices inside the vehicle to supplement the heat to the air which has flowed through the first internal heat exchanger.

It should be noted that the second temperature threshold is greater than the first temperature threshold. That is, when switching the dehumidification mode, it is necessary to perform hysteresis processing on the external ambient temperature. At this time, second temperature threshold=first temperature threshold+preset temperature difference. In an implementation, the preset temperature difference is 5° C.

In an implementation, the load threshold includes: a power consumption at a minimum rotational speed of a compressor, or a correction value after correcting the power consumption at the minimum rotational speed of the compressor through a preset correction algorithm.

S304. Determining a first lower limit for operating a second electronic expansion valve according to the external ambient temperature and a preset first corresponding relationship.

In this step, the second electronic expansion valve is installed at an input end of the first internal heat exchanger.

In the present embodiment, as shown in FIG. 1, the first internal heat exchanger is the evaporator 102, and the second electronic expansion valve is an electronic expansion valve in front of the evaporator 102, i.e., the electronic expansion valve 107.

S305. Using a preset algorithm to determine a first upper limit for operating the second electronic expansion valve according to the external ambient temperature, the temperature of the passenger compartment, the percentage of internal circulation, the percentage of external circulation and the blower air volume.

In this step, an impact factor is first calculated as follows:

$$impact\ factor = (external\ ambient\ temperature * percentage\ of\ external\ circulation + temperature\ of\ passenger\ compartment * percentage\ of\ internal\ circulation) * blower\ air\ volume.$$

According to a calculation result of the impact factor and a mapping relationship corresponding to the impact factor, a corresponding first upper limit for operating the second electronic expansion valve is determined.

S306. Determining a second upper limit and a second lower limit for operating a first electronic expansion valve according to the external ambient temperature and a second preset corresponding relationship.

In this step, the first electronic expansion valve is installed at an output end of the second internal heat exchanger.

In the present embodiment, as shown in FIG. 1, the first electronic expansion valve is the electronic expansion valve 106, the second internal exchanger is the internal condenser 103, and the one-way stop valve 108 for preventing backflow of the refrigerant is installed at an output end of the internal condenser 103.

In steps S304-S306, the reason why the upper and lower limits of the opening degree of the first electronic expansion valve and/or the second electronic expansion valve are limited is that the heat that the heat pump system can actively absorb is related to the external environment temperature under the limitation of the external environment. In order to avoid that the opening degree of the electronic expansion valve is continuously increased or decreased with the objective limit being ignored when the heat pump system is working, causing system oscillation and serious noise, or the excessive opening degree fluctuation range results in a long adjustment time when there is a huge difference between the electronic expansion valve's current opening degree and target opening degree of the control instruction in a certain time, which will also affect the stability of the system; or the adjustment function of the electronic expansion valve has failed after exceeding the upper and lower limits. In order to prevent the controller from issuing an invalid target opening degree, its upper and lower limits are limited to maintain the stability of the entire heat pump system.

S307. Determining a first closed-loop control instruction of a compressor according to the first target temperature and a first closed-loop control model.

In this step, the first target temperature includes the air temperature at the air outlet of the air transmission heat exchange box.

S308. Determining a second closed-loop control instruction of the first electronic expansion valve according to a target subcooling degree and a second closed-loop control model.

In this step, the target subcooling degree includes a subcooling degree of the heat exchange medium, i.e., the refrigerant at the output end of the second internal heat exchanger.

S309. Determining a third closed-loop control instruction of the second electronic expansion valve according to a second target temperature and a third closed-loop control model.

In this step, the second target temperature includes the air temperature of the air outlet side where the first internal heat exchanger is installed in the air transmission heat exchange box.

S310. Outputting the first closed-loop control instruction, the second closed-loop control instruction and the third closed-loop control instruction to the compressor, the first electronic expansion valve, and the second electronic expansion valve respectively, so that the first target temperature and the second target temperature simultaneously meet a preset requirement of a dehumidification function.

In this step, the second target temperature is an air temperature at the air outlet side where the first internal heat exchanger is located.

In steps S307-S310, the compressor is configured to perform closed-loop control on the temperature of the air outlet. Compared with the prior art in which the compressor is configured to control the temperature of the air outlet side where the first internal heat exchanger is installed, i.e., the second target temperature, in the present application, the temperature of the air outlet, i.e., the first target temperature, is controlled by the compressor, which is easier to achieve the purpose of stable control. In this way, the technical obstacle of simultaneous stable control of the first target temperature and the second target temperature is overcome, and the problem of vibration of the heat pump system caused by the prior art is avoided.

S311. Obtaining a pressure value at an input end of the compressor.

In this step, when the first dehumidification mode is executed, the heat exchange medium in the parallel heat supplement path and the refrigeration path has a common low pressure value after evaporation, and a pressure sensor is installed at the input end of the compressor to monitor the pressure value in real time.

S312. If the pressure value is less than a first pressure threshold, suspending outputting the second closed-loop control instruction of the first electronic expansion valve, and switching to increasing an opening degree of the first electronic expansion valve at a preset rate until the pressure value is greater than or equal to a second pressure threshold to resume outputting the second closed-loop control instruction.

In this step, if the pressure value at a low-pressure end of the compressor is less than the first pressure threshold, the closed-loop control of the subcooling degree of the first electronic expansion valve is suspended and it is switched to increase the first electronic expansion valve at a preset rate (such as 0.1%/S). At the same time, it is detected whether the pressure value returns to the second pressure threshold in real time, and if it returns, continues to execute the closed-loop control of the first electronic expansion valve.

By controlling the pressure at the low-pressure end, the pressure of the heat pump system is prevented from being unbalanced. This is because the way of parallel dehumidification is likely to cause system oscillation. In order to improve safety, reduce oscillation or prevent oscillation beyond the system's adjustment capacity, the inventor of the present application found that monitoring the pressure value at the low-pressure end is an effective measure to prevent oscillation. Since the calculation and execution of the control instruction has a certain delay, the pressure value at the low-pressure end is lower than the first pressure threshold, which means that the influence of this delay may make the working state of the entire system exceed the system adjustment ability under the first dehumidification mode, or, that the closed-loop adjustment is too fast, and the system state does not maintain up with it in time. At this time, the closed-loop control is suspended and the adjustment is continued after the pressure on the low-pressure side recovers, so that the stability of the system is further guaranteed.

S313. In response to a frosting protection starting instruction of the first internal heat exchanger, closing a second electronic expansion valve, recording a first opening degree value of the second electronic expansion valve before closing, and maintaining a rotational speed of a compressor unchanged, where the second electronic expansion valve is installed at an input end of the first internal heat exchanger.

S314. In response to a frosting protection shutdown instruction of the first internal heat exchanger, setting an initial opening degree value of the second electronic expansion valve to the first opening degree value, and restoring a closed-loop control of the second electronic expansion valve.

For steps S313 and S314, although the control strategy of the first dehumidification mode is theoretically safe, in the actual process, due to the influence of various factors that cannot be predicted in advance, such as the conflict of the effective time of various control instructions and the delay characteristics when executing, the phenomenon of frosting of the first internal heat exchanger will still occur in extreme cases. After the sensor detects frosting, the frosting protection will be activated immediately, the heat exchange of the first internal heat exchanger will be stopped, and the dehumidification is continued after the defrosting, avoiding the danger of damage to the first internal heat exchanger due to frosting/icing of the first internal heat exchanger, and improving the stability and safety of the heat pump system.

It should be noted that there is no sequence requirement for S312-S314 and S307-S310, which can be understood as being controlled by parallel threads.

The following steps are the steps in the second dehumidification mode.

S315. Obtaining a water temperature of a cooling circuit of a battery in a coolant fluid circulation system.

In this step, in addition to the heat pump system, the on-board thermal management system also has a coolant fluid circulation system for thermal management of power devices such as power batteries, motors, and engines. Since the power device generates a lot of heat during operation, it is generally cooled by the coolant fluid circulation system to dissipate the heat to the external environment. The water temperature of the cooling circuit of the battery can be obtained through a temperature sensor at a preset position on the coolant fluid pipeline.

S316. Determining whether a residual heat of the battery meets a heat supplement requirement according to the water temperature and a target air outlet temperature of an air outlet.

In this step, according to a temperature difference between the water temperature and the target air outlet temperature of the air outlet, a heat transfer direction can be known; and then according to a specific heat capacity of the coolant fluid, it can be known whether the heat in the cooling circuit of the battery meets the requirements of dehumidification and heat supplement. If yes, step S317 is executed, otherwise step S318 is executed.

S317. Guiding a coolant fluid of a cooling circuit of the battery into a warm air core for heating the passenger compartment by controlling a corresponding electronic expansion valve.

In the present embodiment, the warm air core is configured to perform heat supplement and temperature elevation on the passenger compartment through the coolant fluid. The warm air core can be installed in the air transmission heat exchange box to heat the air in front of the air outlet.

S318. Turning on a heating device to heat the coolant fluid flowing through the warm air core.

In this step, the heating device includes a PTC heater, and the coolant fluid is heated through the PTC heater, and then the air in the air transmission heat exchange box is heated when the coolant fluid flows through the warm air core.

For steps S315-S318, when the external environment cannot provide enough heat, the heat is absorbed from the heating device inside the vehicle is chosen for dehumidification and heat supplement, and preferably battery cooling or a residual heat in coolant fluid of the driving motor or engine is used for heat supplement, to realize the recovery and management of heat energy. When the residual heat is still not enough, its own energy is used for heating, to achieve the effect of reducing energy consumption as much as possible while ensuring the dehumidification effect, so that more energy can be used to drive vehicles to improve the mileage of new energy vehicles.

The embodiment of the present application provides a dehumidification mode control method, implemented by means of: obtaining a dehumidification load of a heat pump system and an external ambient temperature when it is detected that a passenger compartment has a dehumidification demand, where the heat pump system includes an external heat exchanger and a first internal heat exchanger; then determining whether to enter a first dehumidification mode according to the dehumidification load, the external ambient temperature and a load threshold, where the first dehumidification mode is configured to perform heat supplement and temperature elevation on air which has flowed through the first internal heat exchanger, using heat absorbed from an external environment through the external heat exchanger during a dehumidification process; if yes, then determining a control instruction of the first dehumidification mode according to an air temperature at multiple first preset positions in an air transmission heat exchange box and a subcooling degree of a heat exchange medium at at least one second preset position in a transmission pipeline; and then outputting the control instruction so that a first target temperature and a second target temperature simultaneously meet a preset requirement of a dehumidification function. The technical problem of how to dehumidify new energy vehicles is solved. By actively absorbing the heat of the external environment to supplement heat to the dehumidified air, the technical effects of saving energy and improving the stability and safety of the system are achieved.

Figure 4:
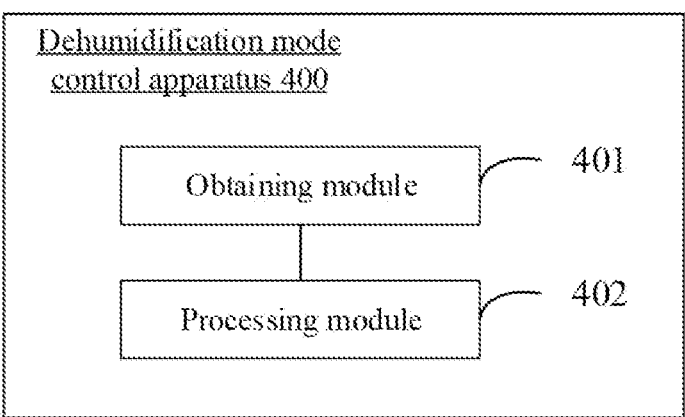
FIG. 4 is a schematic structural diagram of a dehumidification mode control apparatus provided by an embodiment of the present application.

FIG. 4 is a schematic structural diagram of a dehumidification mode control apparatus provided by an embodiment of the present application. The dehumidification mode control apparatus 400 can be realized by software, hardware or a combination of both.

As shown in FIG. 4, the dehumidification mode control apparatus 400 includes:

As shown in FIG. 4, the image processing apparatus 400 includes:

an obtaining module 401, configured to obtain a dehumidification load of a heat pump system and an external ambient temperature when it is detected that a passenger compartment has a dehumidification demand, where the heat pump system includes an external heat exchanger and a first internal heat exchanger;

a processing module 402, configured to:
determine whether to enter a first dehumidification mode according to the dehumidification load, the external ambient temperature and a load threshold, where the first dehumidification mode is configured to perform heat supplement and temperature elevation on air which has flowed through the first internal heat exchanger, using heat absorbed from an external environment through the external heat exchanger during a dehumidification process;

if yes, determine a control instruction of the first dehumidification mode according to an air temperature at multiple first preset positions in an air transmission heat exchange box and a subcooling degree of a heat exchange medium at at least one second preset position in a transmission pipeline, where the first preset position includes an air outlet and an air outlet side where the first internal heat exchanger is located; and output the control instruction so that a first target temperature and a second target temperature simultaneously meet a preset requirement of a dehumidification function, where the first target temperature includes an air temperature at the air outlet, the second target temperature is an air temperature at the air outlet side where the first internal heat exchanger is located.

In a possible design, in the first dehumidification mode, the control instruction includes a closed-loop control instruction for performing closed-loop control on each object to be controlled in the heat pump system, a function of the object to be controlled includes circulating the heat exchange medium along a parallel circulation path in the transmission pipeline, and the parallel circulation path includes: a heat absorption path, a refrigeration path and a heat supplement path, the heat absorption path and the refrigeration path are connected in parallel and then connected in series with the heat supplement path;

the external heat exchanger is located on the heat absorption path, the first internal heat exchanger is located on the refrigeration path, and the heat pump system further includes a second internal heat exchanger, the second internal heat exchanger is located on the heat supplement path, the second internal heat exchanger is configured to transfer heat absorbed by the external heat exchanger to the air which has flowed through the first internal heat exchanger.

In a possible design, the second preset position includes an output end of the second internal heat exchanger, and correspondingly, the subcooling degree includes a target subcooling degree of the output end;

correspondingly, the processing module 402 is configured to determine a first closed-loop control instruction of a compressor according to the first target temperature and a first closed-loop control model;

determine a second closed-loop control instruction of a first electronic expansion valve according to the target subcooling degree and a second closed-loop control model, where the first electronic expansion valve is installed at the output end of the second internal heat exchanger; and determine a third closed-loop control instruction of a second electronic expansion valve according to the second target temperature and a third closed-loop control model, where the second electronic expansion valve is installed at an input end of the first internal heat exchanger.

In a possible design, the obtaining module 401 is configured to obtain a temperature of the passenger compartment, a percentage of internal circulation, a percentage of external circulation and a blower air volume;

the processing module 402 is configured to use a preset load model to determine the dehumidification load according to a preset standard value of the first target temperature, the external ambient temperature, the percentage of external circulation, the temperature of the passenger compartment, the percentage of internal circulation and the blower air volume.

In a possible design, the processing module 402 is further configured to determine a first lower limit for operating the second electronic expansion valve according to the external ambient temperature and a preset first corresponding relationship, where the second electronic expansion valve is installed at an input end of the first internal heat exchanger;

the obtaining module 401 is also configured to obtain a temperature of the passenger compartment, a percentage of internal circulation, a percentage of external circulation and a blower air volume; and the processing module 402 is further configured to use a preset algorithm to determine a first upper limit for operating the second electronic expansion valve according to the external ambient temperature, the temperature of the passenger compartment, the percentage of internal circulation, the external circulation percentage and the blower air volume; the first upper limit and the first lower limit are used to suspend or switch a dehumidification mode of the heat pump system when the external ambient temperature exceeds a first temperature range.

In a possible design, the processing module 402 is further configured to: determine a second upper limit and a second lower limit for operating a first electronic expansion valve according to the external ambient temperature and a preset second corresponding relationship, where the first electronic expansion valve is installed at an output end of the second internal heat exchanger; the second upper limit and the second lower limit are used to suspend or switch a dehumidification mode of the heat pump system when the external ambient temperature exceeds a second temperature range.

In a possible design, the processing module 402 is also configured to:

if it is detected that an opening degree of the first electronic expansion valve is the second lower limit, and a subcooling degree of the output end of the second internal heat exchanger is less than or equal to a preset subcooling degree threshold during a preset time, switch a dehumidification mode to a second dehumidification mode, where the second dehumidification mode is configured to perform heat supplement and temperature elevation on the air which has flowed through the first internal heat exchanger, using heat of a cooling circuit of a battery or heat of a heating device during the dehumidification process.

In a possible design, the obtaining module 401 is also configured to obtain a pressure value at an input end of a compressor;

the processing module 402 is further configured to, if the pressure value is less than a first pressure threshold, suspend outputting the second closed-loop control instruction of the first electronic expansion valve, switch to increasing an opening degree of the first electronic expansion valve at a preset rate until the pressure value is greater than or equal to a second pressure threshold to resume outputting the second closed-loop control instruction, where the first electronic expansion valve is installed at an output end of the second internal heat exchanger.

In a possible design, the processing module 402 is further configured to, in response to a frosting protection starting instruction of the first internal heat exchanger, close a second electronic expansion valve, record a first opening degree value of the second electronic expansion valve before closing, and maintain a rotational speed of a compressor unchanged, where the second electronic expansion valve is installed at an input end of the first internal heat exchanger.

In a possible design, the processing module 402 is further configured to, in response to a frosting protection shutdown instruction of the first internal heat exchanger, set an initial opening degree value of the second electronic expansion valve to the first opening degree value, and restore a closed-loop control of the second electronic expansion valve.

In a possible design, the processing module 402 is configured to determine to enter the first dehumidification mode if the dehumidification load is greater than or equal to the load threshold and the external ambient temperature is less than or equal to a first temperature threshold.

In a possible design, the processing module 402 is configured to, if the dehumidification load is less than the load threshold, or the external ambient temperature is greater than or equal to a second temperature threshold, determine to enter a second dehumidification mode, where the second dehumidification mode is configured to perform heat supplement and temperature elevation on the air which has flowed through the first internal heat exchanger, using heat of a cooling circuit of a battery or heat of a heating device during the dehumidification process, the second temperature threshold is greater than the first temperature threshold.

In a possible design, the obtaining module 401 is further configured to obtain a water temperature of the cooling circuit of the battery in a coolant fluid circulation system;
the processing module 402 is also configured to:
determine whether a residual heat of the battery meets a heat supplement requirement according to the water temperature and a target air outlet temperature of the air outlet;
if yes, guide a coolant fluid of the cooling circuit of the battery into a warm air core, which is configured to heat the air which has flowed through the first internal heat exchanger by controlling a corresponding electronic expansion valve, where the warm air core is configured to perform heat supplement and temperature elevation on the air which has flowed through the first internal heat exchanger through the coolant fluid;
if not, turn on a heating device to heat the coolant fluid flowing through the warm air core.

It is worth noting that the apparatus provided in the embodiment shown in FIG. 4 can execute the method provided in any of the above-mentioned method embodiments, and its specific implementation principles, technical features, explanations of technical terms, and technical effects are similar, and will not be repeated here.

Figure 5:
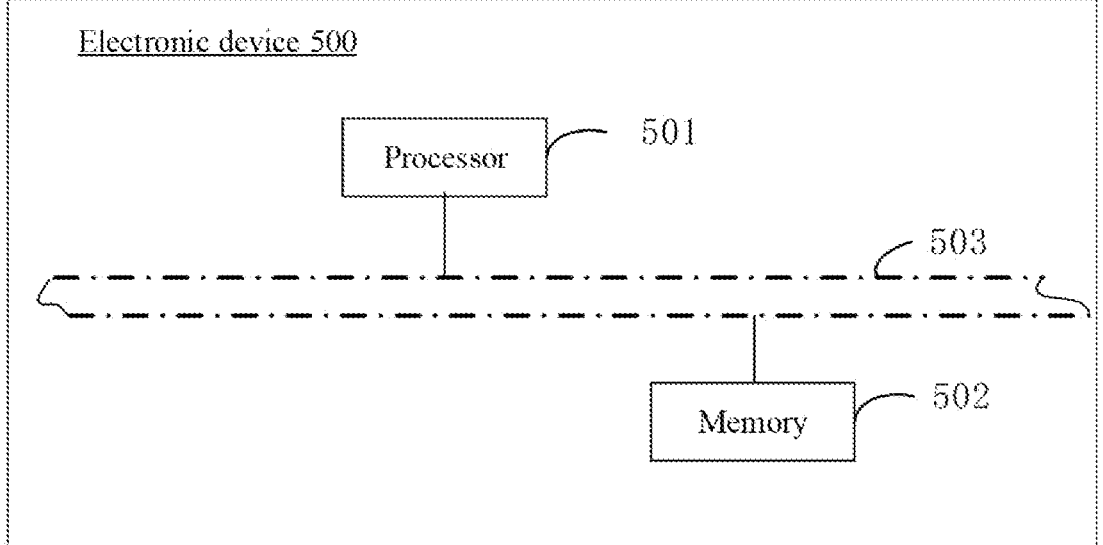
FIG. 5 is a schematic structural diagram of an electronic device provided by an embodiment of the present application.

FIG. 5 is a schematic structural diagram of an electronic device provided by an embodiment of the present application. As shown in FIG. 5, the electronic device 500 may include: at least one processor 501 and a memory 502. FIG. 5 shows an electronic device with one processor as an example.

The memory 502 is configured to store a program. Specifically, the program may include a program code, and the program code includes computer-executable instructions.

The memory 502 may include a high-speed RAM memory, and may also include a non-volatile memory, such as at least a disk memory.

The processor 501 is configured to execute the computer-executable instructions stored in the memory 502 to implement the methods described in the above method embodiments.

Where, the processor 501 may be a central processing unit (CPU), or a specific integrated circuit (ASIC), or be configured as one or multiple integrated circuits to implement embodiments of the present application.

In an implementation, the memory 502 can be independent or integrated with the processor 501. When the memory 502 is a device independent of the processor 501, the electronic device 500 may further include:
a bus 503, configured to connect the processor 501 and the memory 502. The bus may be an industry standard architecture (ISA) bus, a peripheral component interconnect (PCI) bus, an extended industry standard architecture (EISA) bus, or the like. The bus can be divided into address bus, data bus, control bus, etc., but it does not mean that there is only one bus or one type of bus.

In an implementation if the memory 502 and the processor 501 are integrated and implemented on one chip, the memory 502 and the processor 501 may communicate through an internal interface.

The embodiment of the present application also provides a computer-readable storage medium, and the computer-readable storage medium may include: a U disk, a removable hard disk, a read-only memory (ROM), a random access memory (RAM), a magnetic disk or an optical disk, and other medium that can store program codes. Specifically, the computer-readable storage medium stores program instructions, and the program instructions are used in the methods in the above-mentioned method embodiments.

An embodiment of the present application further provides a computer program product, including a computer program which, when executed by a processor, implement the methods in the above-mentioned method embodiments.

An embodiment of the present application further provides a computer program which, when executed by a processor, implements the methods in the above-mentioned method embodiments.

The above are only specific implementations of the present application, but the scope of protection of the present application is not limited thereto. All changes or substitutions within the technical scope disclosed in the present application, which can be easily thought of by any of those skilled in the art, shall be covered within the scope of protection of the present application. Therefore, the protection scope of the present application should be determined by the protection scope of the claims.

What is claimed is:
1. A dehumidification mode control method, comprising:
obtaining a dehumidification load of a heat pump system and an external ambient temperature when it is detected that a passenger compartment has a dehumidification demand, wherein the heat pump system includes an external heat exchanger and a first internal heat exchanger;
determining whether to enter a first dehumidification mode according to the dehumidification load, the external ambient temperature and a load threshold, wherein the first dehumidification mode is configured to perform heat supplement and temperature elevation on air which has flowed through the first internal heat exchanger, using heat absorbed from an external environment through the external heat exchanger during a dehumidification process;

determining to enter the first dehumidification mode, determining a control instruction of the first dehumidification mode according to an air temperature at multiple first preset positions in an air transmission heat exchange box and a subcooling degree of a heat exchange medium at at least one second preset position in a transmission pipeline, wherein the first preset position comprises an air outlet and an air outlet side where the first internal heat exchanger is located; and outputting the control instruction so that a first target temperature and a second target temperature simultaneously meet a preset requirement of a dehumidification function, wherein the first target temperature comprises an air temperature at the air outlet, the second target temperature is an air temperature at the air outlet side.

2. The control method according to claim 1, wherein, in the first dehumidification mode, the control instruction comprises a closed-loop control instruction for performing closed-loop control on each object to be controlled in the heat pump system, a function of the object to be controlled comprises circulating the heat exchange medium along a parallel circulation path in the transmission pipeline, and the parallel circulation path comprises: a heat absorption path, a refrigeration path and a heat supplement path, the heat absorption path and the refrigeration path are connected in parallel and then connected in series with the heat supplement path;

the external heat exchanger is located on the heat absorption path, the first internal heat exchanger is located on the refrigeration path, and the heat pump system further comprises a second internal heat exchanger, the second internal heat exchanger is located on the heat supplement path, the second internal heat exchanger is configured to transfer heat absorbed by the external heat exchanger to the air which has flowed through the first internal heat exchanger.

3. The control method according to claim 2, wherein the second preset position comprises an output end of the second internal heat exchanger, and correspondingly, the subcooling degree comprises a target subcooling degree of the output end;

the determining the control instruction of the first dehumidification mode according to the air temperature at the multiple first preset positions in the air transmission heat exchange box and the subcooling degree of the heat exchange medium at the at least one second preset position in the transmission pipeline comprises:

determining a first closed-loop control instruction of a compressor according to the first target temperature and a first closed-loop control model;

determining a second closed-loop control instruction of a first electronic expansion valve according to the target subcooling degree and a second closed-loop control model, wherein the first electronic expansion valve is installed at the output end of the second internal heat exchanger; and determining a third closed-loop control instruction of a second electronic expansion valve according to the second target temperature and a third closed-loop control model, wherein the second electronic expansion valve is installed at an input end of the first internal heat exchanger.

4. The control method according to claim 2, before the determining the control instruction of the first dehumidification mode according to the air temperature at the multiple first preset positions in the air transmission heat exchange box and the subcooling degree of the heat exchange medium at the at least one second preset position in the transmission pipeline, further comprising:

determining a second upper limit and a second lower limit for operating a first electronic expansion valve according to the external ambient temperature and a preset second corresponding relationship, wherein the first electronic expansion valve is installed at an output end of the second internal heat exchanger.

5. The control method according to claim 4, after the outputting the control instruction, further comprising:

detecting that an opening degree of the first electronic expansion valve is the second lower limit, and a subcooling degree of the output end of the second internal heat exchanger is less than or equal to a preset subcooling degree threshold during a preset time, switching a dehumidification mode to a second dehumidification mode, wherein the second dehumidification mode is configured to perform heat supplement and temperature elevation on the air which has flowed through the first internal heat exchanger, using heat of a cooling circuit of a battery or heat of a heating device during the dehumidification process.

6. The control method according to claim 1, wherein the obtaining the dehumidification load of the heat pump system comprises:

obtaining a temperature of the passenger compartment, a percentage of internal circulation, a percentage of external circulation and a blower air volume; and using a preset load model to determine the dehumidification load according to a preset standard value of the first target temperature, the external ambient temperature, the percentage of external circulation, the temperature of the passenger compartment, the percentage of internal circulation and the blower air volume.

7. The control method according to claim 1, before the determining the control instruction of the first dehumidification mode according to the air temperature at the multiple first preset positions in the air transmission heat exchange box and the subcooling degree of the heat exchange medium at the at least one second preset position in the transmission pipeline, further comprising:

determining a first lower limit for operating second electronic expansion valve according to the external ambient temperature and a preset first corresponding relationship, wherein the second electronic expansion valve is installed at an input end of the first internal heat exchanger;

obtaining a temperature of the passenger compartment, a percentage of internal circulation, a percentage of external circulation and a blower air volume; and using a preset algorithm to determine a first upper limit for operating the second electronic expansion valve according to the external ambient temperature, the temperature of the passenger compartment, the percentage of internal circulation, an external circulation percentage and the blower air volume.

8. The control method according to claim 1, after the outputting the control instruction, further comprising:

obtaining a pressure value at an input end of a compressor;

detecting that the pressure value is less than a first pressure threshold, suspending outputting a second closed-loop control instruction of a first electronic expansion valve, switching to increasing an opening degree of the first electronic expansion valve at a preset rate until the pressure value is greater than or equal to a second pressure threshold to resume outputting the second closed-loop control instruction, wherein the first electronic expansion valve is installed at an output end of a second internal heat exchanger.

9. The control method according to claim 1, after the outputting the control instruction, further comprising:

in response to a frosting protection starting instruction of the first internal heat exchanger, closing a second electronic expansion valve, recording a first opening degree value of the second electronic expansion valve before closing, and maintaining a rotational speed of a compressor unchanged, wherein the second electronic expansion valve is installed at an input end of the first internal heat exchanger.

10. The control method according to claim 9, after the closing the second electronic expansion valve and maintaining the rotational speed of the compressor unchanged, further comprising:

in response to a frosting protection shutdown instruction of the first internal heat exchanger, setting an initial opening degree value of the second electronic expansion valve to the first opening degree value, and restoring a closed-loop control of the second electronic expansion valve.

11. The control method according to claim 1, wherein the determining whether to enter the first dehumidification mode according to the dehumidification load, the external ambient temperature and the load threshold comprises:

detecting that the dehumidification load is greater than or equal to the load threshold and the external ambient temperature is less than or equal to a first temperature threshold, determining to enter the first dehumidification mode.

12. The control method according to claim 11, wherein the determining whether to enter the first dehumidification mode according to the dehumidification load, the external ambient temperature and the load threshold further comprises:

detecting that the dehumidification load is less than the load threshold, or the external ambient temperature is greater than or equal to a second temperature threshold, determining to enter a second dehumidification mode, wherein the second dehumidification mode is configured to perform heat supplement and temperature elevation on the air which has flowed through the first internal heat exchanger, using heat of a cooling circuit of a battery or heat of a heating device during the dehumidification process, the second temperature threshold is greater than the first temperature threshold.

13. The control method according to claim 12, after the determining to enter the second dehumidification mode, further comprising:

obtaining a water temperature of the cooling circuit of the battery in a coolant fluid circulation system;

determining whether a residual heat of the battery meets a heat supplement requirement according to the water temperature and a target air outlet temperature of the air outlet;

determining that the residual heat of the battery meets the heat supplement requirement, guiding a coolant fluid of the cooling circuit of the battery into a warm air core by controlling a corresponding electronic expansion valve, wherein the warm air core is configured to perform heat supplement and temperature elevation on the air which has flowed through the first internal heat exchanger through the coolant fluid; and determining that the residual heat of the battery does not meet the heat supplement requirement, turning on a heating device to heat the coolant fluid flowing through the warm air core.

14. A dehumidification mode control apparatus, comprising:

a processor, and a memory, which is communicatively connected with the processor;

the memory stores computer-executable instructions;

the processor, when executing the computer-executable instructions, which are stored in the memory, is configured to:

obtain a dehumidification load of a heat pump system and an external ambient temperature when it is detected that a passenger compartment has a dehumidification demand, wherein the heat pump system includes an external heat exchanger and a first internal heat exchanger;

determine whether to enter a first dehumidification mode according to the dehumidification load, the external ambient temperature and a load threshold, wherein the first dehumidification mode is configured to perform heat supplement and temperature elevation on air which has flowed through the first internal heat exchanger, using heat absorbed from an external environment through the external heat exchanger during a dehumidification process;

determine to enter the first dehumidification mode, determine a control instruction of the first dehumidification mode according to an air temperature at multiple first preset positions in an air transmission heat exchange box and a subcooling degree of a heat exchange medium at at least one second preset position in a transmission pipeline, wherein the first preset position comprises an air outlet and an air outlet side where the first internal heat exchanger is located; and output the control instruction so that a first target temperature and a second target temperature simultaneously meet a preset requirement of a dehumidification function, wherein the first target temperature comprises an air temperature at the air outlet, the second target temperature is an air temperature at the air outlet side.

15. The dehumidification mode control apparatus according to claim 14, wherein, in the first dehumidification mode, the control instruction comprises a closed-loop control instruction for performing closed-loop control on each object to be controlled in the heat pump system, a function of the object to be controlled comprises circulating the heat exchange medium along a parallel circulation path in the transmission pipeline, and the parallel circulation path comprises: a heat absorption path, a refrigeration path and a heat supplement path, the heat absorption path and the refrigeration path are connected in parallel and then connected in series with the heat supplement path;

the external heat exchanger is located on the heat absorption path, the first internal heat exchanger is located on the refrigeration path, and the heat pump system further comprises a second internal heat exchanger, the second internal heat exchanger is located on the heat supplement path, the second internal heat exchanger is configured to transfer heat absorbed by the external heat exchanger to the air which has flowed through the first internal heat exchanger.

16. The dehumidification mode control apparatus according to claim 14, wherein the processor is configured to:

obtain a temperature of the passenger compartment, a percentage of internal circulation, a percentage of external circulation and a blower air volume; and use a preset load model to determine the dehumidification load according to a preset standard value of the first target temperature, the external ambient temperature, the percentage of external circulation, the temperature of the passenger compartment, the percentage of internal circulation and the blower air volume.

17. A non-transitory computer-readable storage medium, stored with computer-executable instructions which, when executed by a processor, are configured to:

obtain a dehumidification load of a heat pump system and an external ambient temperature when it is detected that a passenger compartment has a dehumidification demand, wherein the heat pump system includes an external heat exchanger and a first internal heat exchanger;

determine whether to enter a first dehumidification mode according to the dehumidification load, the external ambient temperature and a load threshold, wherein the first dehumidification mode is configured to perform heat supplement and temperature elevation on air which has flowed through the first internal heat exchanger, using heat absorbed from an external environment through the external heat exchanger during a dehumidification process;

determine to enter the first dehumidification mode, determine a control instruction of the first dehumidification mode according to an air temperature at multiple first preset positions in an air transmission heat exchange box and a subcooling degree of a heat exchange medium at at least one second preset position in a transmission pipeline, wherein the first preset position comprises an air outlet and an air outlet side where the first internal heat exchanger is located; and output the control instruction so that a first target temperature and a second target temperature simultaneously meet a preset requirement of a dehumidification function, wherein the first target temperature comprises an air temperature at the air outlet, the second target temperature is an air temperature at the air outlet side.

18. The dehumidification mode control apparatus according to claim 15, wherein the second preset position comprises an output end of the second internal heat exchanger, and correspondingly, the subcooling degree comprises a target subcooling degree of the output end;

the processor is configured to:

determine a first closed-loop control instruction of a compressor according to the first target temperature and a first closed-loop control model;

determine a second closed-loop control instruction of a first electronic expansion valve according to the target subcooling degree and a second closed-loop control model, wherein the first electronic expansion valve is installed at the output end of the second internal heat exchanger; and determine a third closed-loop control instruction of a second electronic expansion valve according to the second target temperature and a third closed-loop control model, wherein the second electronic expansion valve is installed at an input end of the first internal heat exchanger.

19. The non-transitory computer-readable storage medium according to claim 17, wherein, in the first dehumidification mode, the control instruction comprises a closed-loop control instruction for performing closed-loop control on each object to be controlled in the heat pump system, a function of the object to be controlled comprises circulating the heat exchange medium along a parallel circulation path in the transmission pipeline, and the parallel circulation path comprises: a heat absorption path, a refrigeration path and a heat supplement path, the heat absorption path and the refrigeration path are connected in parallel and then connected in series with the heat supplement path;

the external heat exchanger is located on the heat absorption path, the first internal heat exchanger is located on the refrigeration path, and the heat pump system further comprises a second internal heat exchanger, the second internal heat exchanger is located on the heat supplement path, the second internal heat exchanger is configured to transfer heat absorbed by the external heat exchanger to the air which has flowed through the first internal heat exchanger.

20. The non-transitory computer-readable storage medium according to claim 19, wherein the second preset position comprises an output end of the second internal heat exchanger, and correspondingly, the subcooling degree comprises a target subcooling degree of the output end;

the computer-executable instructions are configured to:

determine a first closed-loop control instruction of a compressor according to the first target temperature and a first closed-loop control model;

determine a second closed-loop control instruction of a first electronic expansion valve according to the target subcooling degree and a second closed-loop control model, wherein the first electronic expansion valve is installed at the output end of the second internal heat exchanger; and determine a third closed-loop control instruction of a second electronic expansion valve according to the second target temperature and a third closed-loop control model, wherein the second electronic expansion valve is installed at an input end of the first internal heat exchanger.

* * * * *